United States Patent
Sun et al.

(10) Patent No.: US 12,245,284 B2
(45) Date of Patent: Mar. 4, 2025

(54) METHOD FOR 2-STEP RANDOM ACCESS AND TERMINAL

(71) Applicant: VIVO MOBILE COMMUNICATION CO., LTD., Guangdong (CN)

(72) Inventors: Peng Sun, Chang'an Dongguan (CN); Xiaohang Chen, Chang'an Dongguan (CN); Hao Liu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 459 days.

(21) Appl. No.: 17/520,473

(22) Filed: Nov. 5, 2021

(65) Prior Publication Data

US 2022/0061104 A1    Feb. 24, 2022

Related U.S. Application Data

(63) Continuation of application No. PCT/CN2020/089077, filed on May 8, 2020.

(30) Foreign Application Priority Data

May 9, 2019 (CN) .......................... 201910385817.8

(51) Int. Cl.
*H04W 74/0833* (2024.01)
(52) U.S. Cl.
CPC .............. *H04W 74/0833* (2013.01)
(58) Field of Classification Search
CPC ....... H04L 5/0048; H04L 1/08; H04L 5/0051; H04W 74/0833; H04W 74/006; H04W 74/008; H04W 72/23; H04W 74/004; H04W 74/0836; H04W 74/002; H04W 52/146; H04W 72/0446; H04W 72/0453; H04W 72/1268; H04W 72/569

See application file for complete search history.

(56) References Cited

U.S. PATENT DOCUMENTS

| | | | |
|---|---|---|---|
| 2013/0083753 A1 | 4/2013 | Lee et al. | |
| 2019/0141731 A1 | 5/2019 | Yoshimoto et al. | |
| 2020/0045650 A1 | 2/2020 | Suzuki et al. | |
| 2020/0045742 A1 | 2/2020 | Suzuki et al. | |
| 2020/0236716 A1* | 7/2020 | Lei ........................ | H04L 5/0044 |

(Continued)

FOREIGN PATENT DOCUMENTS

| | | | |
|---|---|---|---|
| CN | 106507493 A | 3/2017 | |
| CN | 107306451 A | 10/2017 | |

(Continued)

OTHER PUBLICATIONS

European Search Report in Application No. 20802607.0 Dated Jun. 3, 2022.

(Continued)

*Primary Examiner* — Khoa Huynh
(74) *Attorney, Agent, or Firm* — Price Heneveld LLP (57) ABSTRACT

Embodiments of this disclosure provide a method for 2-step random access and a terminal. The method includes: receiving one or more pieces of configuration information for 2-step random access; and determining a transmission resource and/or a transmission mode based on the configuration information and assistance uplink transmission information, and performing uplink transmission.

17 Claims, 6 Drawing Sheets

(56) References Cited

U.S. PATENT DOCUMENTS

| | | |
|---|---|---|
| 2021/0368493 A1 | 11/2021 | Lin |
| 2022/0210839 A1* | 6/2022 | Rune ................ H04W 36/0077 |

FOREIGN PATENT DOCUMENTS

| | | |
|---|---|---|
| CN | 108934082 A | 12/2018 |
| CN | 109076589 A | 12/2018 |
| CN | 109644467 A | 4/2019 |
| WO | 2016/119354 A1 | 8/2016 |
| WO | 2018/066934 A2 | 4/2018 |
| WO | 2018/126955 A1 | 7/2018 |
| WO | 2018/135631 A1 | 7/2018 |
| WO | 2018/136535 A1 | 7/2018 |
| WO | 2018151230 A1 | 8/2018 |
| WO | 2018/182385 A1 | 10/2018 |

OTHER PUBLICATIONS

"Channel Structure for Two-Step RACH" 3GPP TSG-RAN WG1 Meeting #97, Ericsson, R1-1907180, May 13, 2019.
"Considerations on the 2-step RACH procedure" 3GPP TSG-RAN WG2 Meeting #105bis, vivo, R2-1903077, Apr. 8, 2019.
"Discussion on the MSGA resource configuration" 3GPP TSG-RAN WG2 # 105bis, Huawei, HiSilicon, R2-1904111, Apr. 8, 2019.
"3rd Generation Partnership Project; Technical Specification Group Radio Access Network; NR; Medium Access Control (MAC) protocol specification (Release 15)" 3GPP TS 38.321 V15.5.0, Mar. 2019.
Qualcomm Incorporated, "Procedures for Two-Step RACH", 3GPP TSG-RAN WG1 Meeting #96, R1-1903321, pp. 1-9, (Feb. 21, 2019).
Qualcomm Incorporated, "Lower PAPR reference signals," 3GPP TSG-RAN WG1 Meeting #96, R1-1903468, pp. 1-23, (Feb. 26, 2019).
ZTE, "Summary of 7.2.1.1 Channel Structure for Two-step RACH," 3GPP TSG RAN WG1 #96, R1-1903435, pp. 1-28, (Mar. 1, 2019).
Oppo, "On channel structure for 2-step RACH," 3GPP TSG RAN WG1 #96, R1-1902747, pp. 1-5, (Mar. 1, 2019).
Nokia et al., "On 2-step RACH Channel Structure," 3GPP TSG RAN WG1 #96bis, R1-1904715, pp. 1-13, (Apr. 12, 2019).
Qualcomm Incorporated, "Channel Structure for Two-Step RACH," 33GPP TSG-RAN WG1 Meeting #97, R1-1907255, pp. 1-18, (May 3, 2019).
Written Opinion of the International Searching Authority dated Aug. 11, 2020 as received in Application No. PCT/CN2020/089077.
CN Office Action dated Nov. 3, 2021 as received in Application No. 201910385817.8.
IN Office Action dated Mar. 31, 2022 as received in Application No. 202127054165.

* cited by examiner

METHOD FOR 2-STEP RANDOM ACCESS AND TERMINAL

CROSS-REFERENCE TO RELATED APPLICATIONS

This application is a continuation application of PCT Application No. PCT/CN2020/089077 filed on May 8, 2020, which claims priority to Chinese Patent Application No. 201910385817.8 filed in China on May 9, 2019, disclosures of which are incorporated herein by reference in their entireties.

TECHNICAL FIELD

Embodiments of this disclosure relate to the field of communications technologies, and specifically, to a method for 2-step random access and a terminal.

BACKGROUND

Modulation schemes such as π(Pi)/2 binary phase shift keying (BPSK) and demodulation reference signal (DMRS) sequences based on Pi/2 BPSK cannot be effectively used in a 2-step random access (2SR) procedure, resulting in limited transmit power of a terminal (for example, user equipment (UE)), affecting transmission efficiency and coverage performance.

SUMMARY

According to a first aspect, an embodiment of this disclosure provides a method for 2-step random access, applied to a terminal, where the method includes:
  receiving configuration information for 2-step random access; and
  determining a transmission resource and/or a transmission mode based on the configuration information and assistance uplink transmission information, and performing uplink transmission.

According to a second aspect, an embodiment of this disclosure provides a terminal, including:
  a receiving module, configured to receive configuration information for 2-step random access; and
  a transmission module, configured to determine a transmission resource and/or a transmission mode based on the configuration information and assistance uplink transmission information, and perform transmission.

According to a third aspect, an embodiment of this disclosure further provides a terminal, including a processor, a memory, and a program stored on the memory and capable of running on the processor, where when the program is executed by the processor, the steps of the method for 2-step random access according to the first aspect are implemented.

According to a fourth aspect, an embodiment of this disclosure further provides a computer-readable storage medium, where the computer-readable storage medium stores a computer program, and when the computer program is executed by a processor, the steps of the method for 2-step random access according to the first aspect are implemented.

BRIEF DESCRIPTION OF DRAWINGS

Other advantages and benefits will become clear to persons skilled in the art from the detailed description of the following optional implementations. The accompanying drawings are merely used for showing the optional implementations, and are not considered as a limitation to this disclosure. In all accompanying drawings, a same reference symbol is used to indicate a same part. In the accompanying drawings.

DETAILED DESCRIPTION OF THE EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by persons of ordinary skill in the art based on the embodiments of this disclosure without creative efforts shall fall within the protection scope of this disclosure.

The term "include" and any other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of this disclosure, the term such as "exemplary" or "for example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

For a better understanding of the embodiments of this disclosure, the following describes several technical points:
  Compared with previous mobile communications systems, a future fifth-generation mobile communications (5G) system needs to adapt to more diverse scenarios and service requirements. Main scenarios of new radio (NR) include enhanced mobile broadband (eMBB), massive machine type communication (mMTC), and ultra-reliable low-latency communication (URLLC). In these scenarios, requirements for high reliability, low latency, large bandwidth, and wide coverage are placed on the system.
1: Random Access Preamble
  In an uplink transmission mode in the related art, if a terminal is to transmit uplink data, the terminal first needs to obtain uplink timing synchronization through a random access procedure, that is, obtain uplink timing advance (TA)

information from a network side. After obtaining the uplink synchronization, the terminal may transmit uplink data by means of dynamic scheduling or semi-persistent scheduling.

When an uplink data packet is small, the manner of transmitting the uplink data after the uplink synchronization is obtained through the random access procedure may cause consumption of resources and electric power. Therefore, in an mMTC scenario, the terminal may transmit uplink data in a non-synchronization state.

Figure 1:
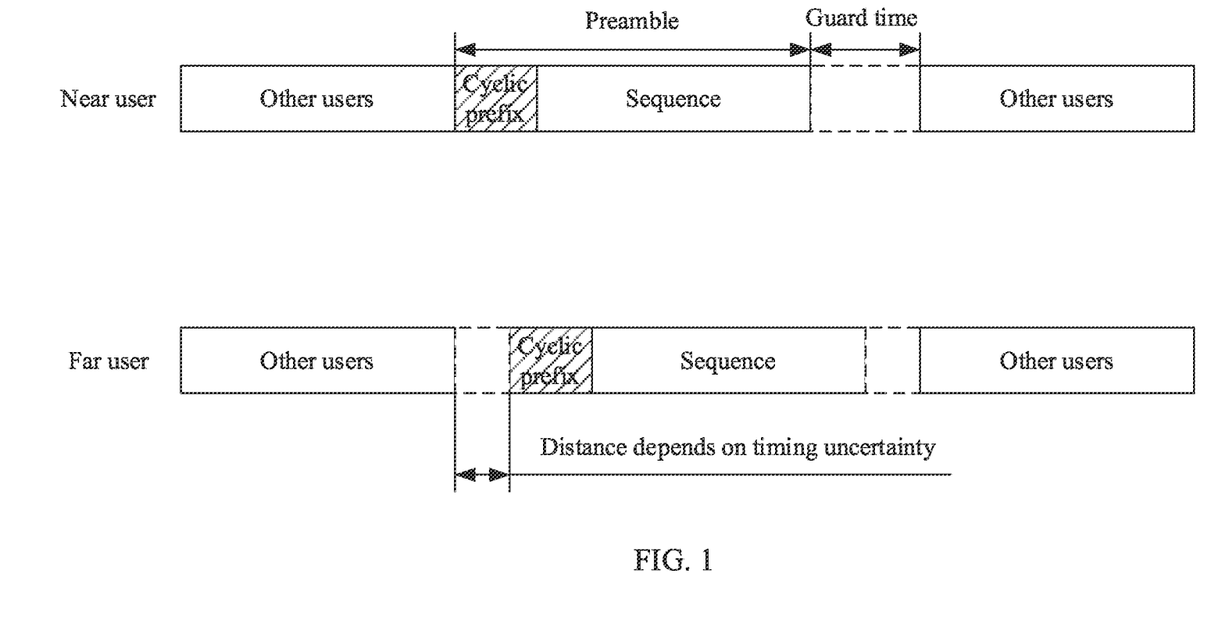
FIG. 1 is a schematic diagram of a preamble.

Similar to the random access procedure, the terminal is also in the non-synchronization state when transmitting a preamble. Therefore, a cyclic prefix (CP) needs to be added to the preamble to offset impact of a transmission delay, as shown in FIG. 1.

2. 4-Step Random Access Procedure and 2-Step Random Access Procedure

Figure 2:
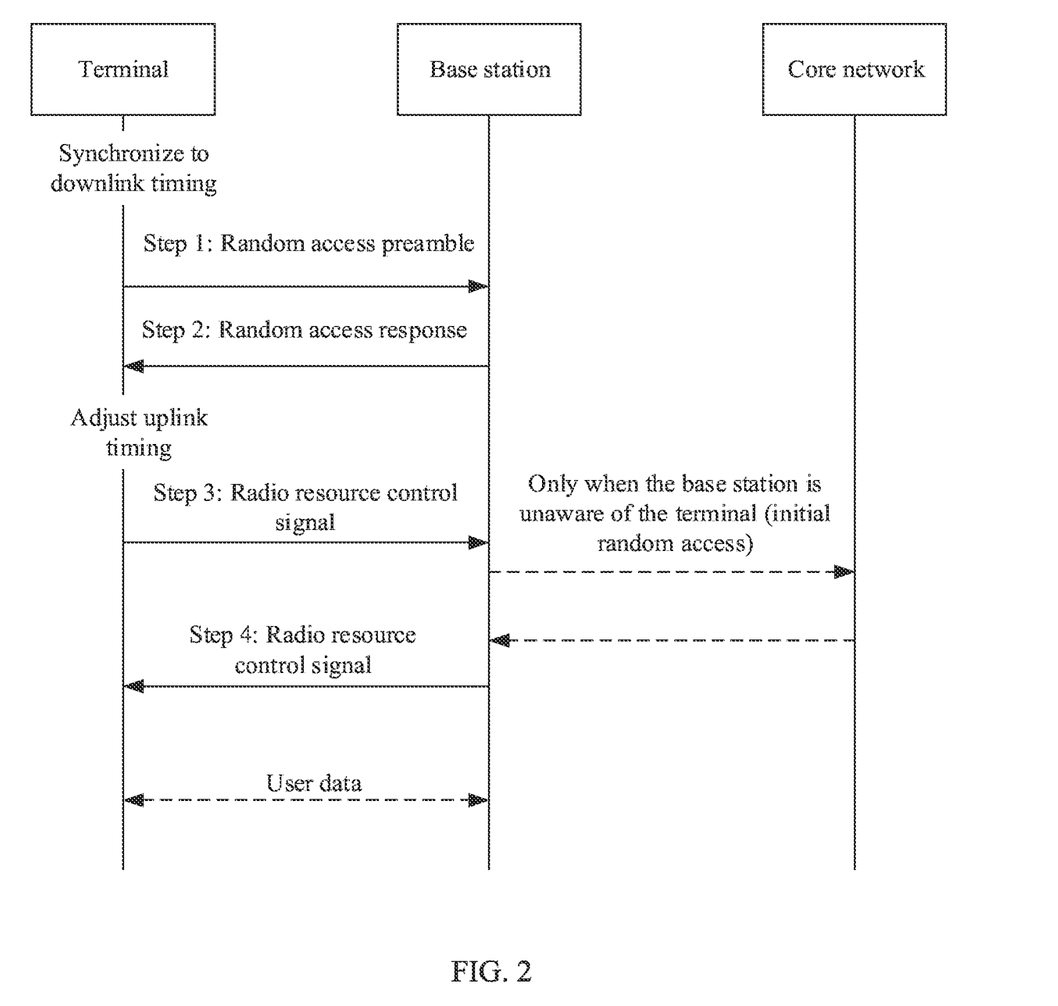
FIG. 2 is a schematic diagram of a 4-step random access procedure.

Referring to FIG. 2, in a 4-step random access procedure, a terminal first transmits a message 1 (msg1) including a preamble to a network side; after detecting the preamble, the network side transmits a message 2 (msg2) including a random access response (RAR) message corresponding the preamble; after receiving the msg2, the terminal transmits a message 3 (msg3) based on an indication of the RAR; after receiving the msg3, the network side transmits a message 4 (msg4) including a contention resolution identifier (contention resolution ID); and when the terminal receives the msg4, the 4-step random access is completed.

In a 2-step random access procedure, the terminal transmits a message A (msgA) to the network side; after receiving the msgA, the network side transmits a message B (msgB) to the terminal; and after the terminal receives the msgB, the 2-step random access is completed.

3. Physical Random Access Channel (PRACH) Occasions

In NR, a base station may configure a plurality of physical random access channel transmission occasions (PRACH transmission occasion, or referred to as physical random access channel occasions (PRACH occasion, RO)) that are frequency division multiplexed (FDM) in one time instance (that is, duration required for transmitting one PRACH resource, or a time domain position for transmitting a PRACH). The number of ROs that can be FDMed in one time instance may be {1, 2, 4, 8}.

A preamble can be transmitted only on a time domain resource configured by the parameter PRACHConfigurationIndex and a frequency domain resource configured by the parameter prach-FDM, and a PRACH frequency domain resource $n_{RA} \in \{0, 1, \ldots, M-1\}$, where M is equal to the parameter prach-FDM. During initial access, PRACH frequency domain resources are indexed in ascending order starting from a RO resource with the lowest frequency in an initial active uplink bandwidth part. Otherwise, the PRACH frequency domain resources are indexed in ascending order starting from a RO resource with the lowest frequency in an active uplink bandwidth part.

In NR, there is an association relationship between ROs and actually transmitted synchronization signal/physical broadcast channel blocks (SS/PBCH block, SSB, also briefly referred to as a synchronization signal block (SS block)). One RO may be associated with a plurality of SSBs, and a number of SSBs associated with one RO may be {⅛, ¼, ½, 1, 2, 4, 8, 16}. For a non-contention based random access procedure, there may also be an association relationship between ROs and channel state information reference signals (CSI-RS).

Figure 3:
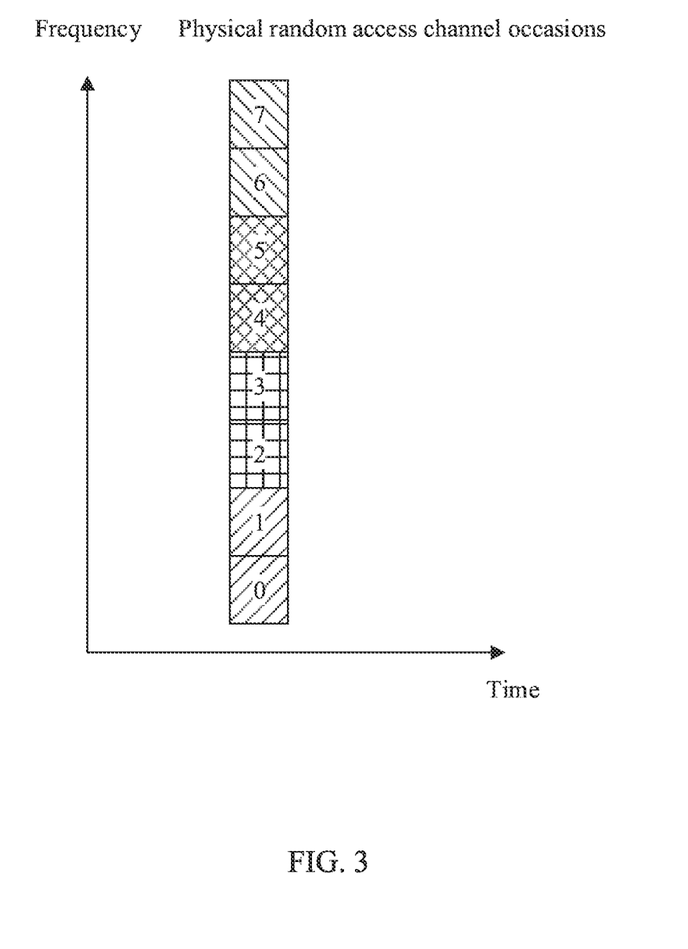
FIG. 3 is a schematic diagram of ROs FDMed in one time instance.

Referring to FIG. 3, a number of ROs FDMed in one time instance is 8, and a number of actually transmitted SSBs is 4. For example, corresponding SSBs are SSB #0, SSB #1, SSB #2, and SSB #3, and each SSB is associated with two ROs. If the terminal transmits a PRACH on a RO corresponding to SSB #0, the terminal selects one RO from RO #0 and RO #1 to transmit the PRACH.

The technology described herein is not limited to a 5G system and a subsequent evolved communications system, and is not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems.

The terms "system" and "network" are often used interchangeably. A CDMA system may implement radio technologies such as CDMA2000 and universal terrestrial radio access (UTRA). UTRA includes wideband CDMA (WCDMA) and other CDMA variants. A TDMA system may implement radio technologies such as global system for mobile communications (GSM). An OFDMA system may implement radio technologies such as ultra mobile broadband (UMB), evolved UTRA (E-UTRA), IEEE 802.11 (Wi-Fi), IEEE 802.16 (WiMAX), IEEE 802.20, and Flash-OFDM. UTRA and E-UTRA are parts of universal mobile telecommunications system (UMTS). LTE and more advanced LTE (such as LTE-A) are new UMTS versions that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies.

Figure 4:
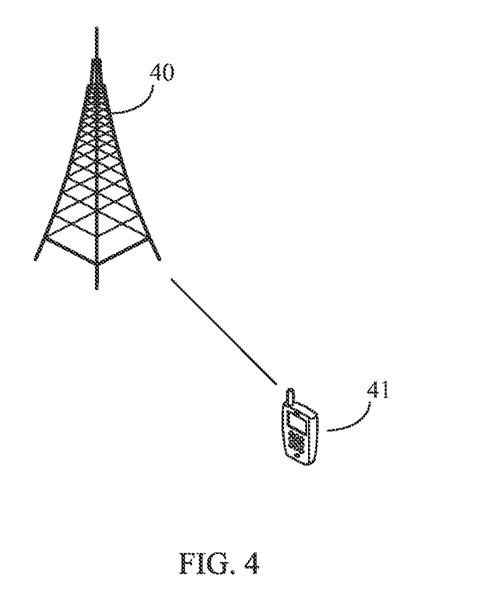
FIG. 4 is a schematic architectural diagram of a wireless communications system according to an embodiment of this disclosure.

The embodiments of this disclosure are described below with reference to the accompanying drawings. A method for 2-step random access and a terminal provided in the embodiments of this disclosure may be applied to a wireless communications system. Referring to FIG. 4, FIG. 4 is a schematic architectural diagram of a wireless communications system according to an embodiment of this disclosure. As shown in FIG. 4, the wireless communications system may include: a network device 40 and a terminal 41. The terminal 41 may be denoted as UE 41. The terminal 41 may perform communication (signaling transmission or data transmission) with the network device 40. In practical applications, connections between the foregoing devices may be wireless connections. To conveniently and intuitively represent a connection relationship between the devices, a solid line is used for illustration in FIG. 4.

The network device 40 provided in this embodiment of this disclosure may be a base station, and the base station may be a commonly used base station, or may be an evolved base station (evolved node base station, eNB), or may be a network device (for example, a next generation base station (next generation node base station, gNB) in a 5G system, a transmission and reception point (TRP)), or another device.

The terminal 41 provided in this embodiment of this disclosure may be a mobile phone, a tablet computer, a laptop computer, an ultra-mobile personal computer (UMPC), a netbook, or personal digital assistant (PDA), a mobile Internet device (MID), a wearable device, a vehicle-mounted device, or the like.

Figure 5:
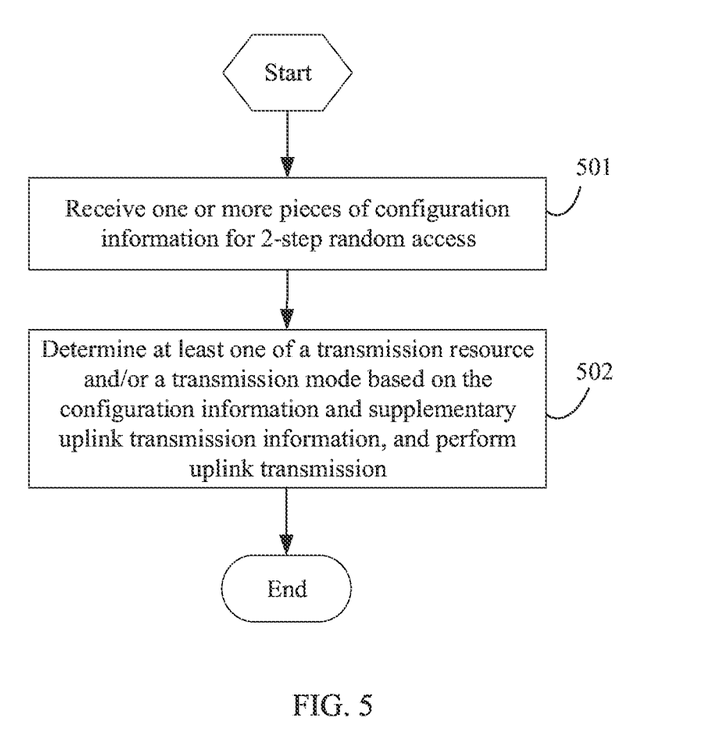
FIG. 5 is a flowchart of a method for 2-step random access according to an embodiment of this disclosure.

As shown in FIG. 5, an embodiment of this disclosure provides a method for 2-step random access. The method is performed by a terminal, and specific steps thereof are as follows.

Step 501: Receive one or more pieces of configuration information for 2-step random access.

In this embodiment of this disclosure, optionally, the configuration information may include but is not limited to one or more of the following (1) to (5).

(1) Information about One or More 2-Step Random Access Resources

For example, types of 2-step random access resources may be a physical random access channel (PRACH) resource and a physical uplink shared channel (PUSCH) resource.

Further, the 2-step random access resource includes but is not limited to one or more of the following (a) to (f):
 (a) a time-frequency resource for occupation by data;
 (b) a time-frequency resource for occupation by a demodulation reference signal (DMRS) sequence;
 (c) a resource for which a DMRS sequence is generated using a zeroth type and data is modulated using a first type modulation;
 (d) a resource for which a DMRS sequence is generated not using a zeroth type and data is modulated not using a first type modulation;
 (e) a resource for which a DMRS sequence is generated not using a zeroth type and data is modulated using a first type modulation; and
 (f) a resource for which a DMRS sequence is generated using a zeroth type and data is modulated not using a first type modulation.

For example, the a first type may be π(Pi)/2 binary phase shift keying (BPSK), or may be quadrature phase shift keying (QPSK), 16 quadrature amplitude modulation (16QAM), 64QAM, 256QAM, 1024QAM, 8 phase shift keying (8PSK), and other possible modulation types. In this way, in this embodiment of this disclosure, a modulation type such as Pi/2 BPSK can be effectively used in a 2-step random access procedure, so as to reduce scenarios of limiting a transmit power of the terminal and improve transmission efficiency and coverage performance.

For example, a DMRS sequence a zeroth type includes but is not limited to one or more of the following: a sequence generated by using a pseudo-random sequence and a QPSK modulation scheme, a sequence generated by using a pseudo-random sequence and a Pi/2 BPSK modulation scheme, a sequence generated based on a ZC sequence, a BPSK sequence obtained based on computer search, a QPSK sequence obtained based on computer search, an 8PSK sequence obtained based on computer search, or the like.

(2) First Information Indicating a Mapping Relationship about 2-Step Random Access Resources Optionally, the first information may further indicate a mapping relationship between PRACH resources and PUSCH resources. The mapping relationship may include that different PUSCH resources correspond to a same PRACH resource, or that different PRACH resources correspond to a same PUSCH resource.

(3) Second Information Indicating a Transmission Mode to be Used

Optionally, the second information is further used to indicate one or more of the following (a) to (i):
 (a) a modulation and coding scheme (MCS);
 (b) data being modulated using a first type modulation;
 (c) data being modulated not using a first type modulation;
 (d) a DMRS sequence being generated using a zeroth type;
 (e) a DMRS sequence being generated not using a zeroth type;
 (f) a transmission coding rate;
 (g) a type of DMRS;
 (h) density of DMRSs; and
 (i) number of DMRSs.

(4) Third Information Indicating Whether a Specified Transmission Mode is to be Used on a 2-Step Random Access Resource For example, the specified transmission mode may be Pi/2 BPSK transmission, and certainly is not limited thereto.

(5) Fourth Information Indicating Time Domain and/or Frequency Domain Information for Resource Configuration It can be understood that if a plurality pieces of configuration information for 2-step random access are received, at least one of the foregoing (1) to (5) in the configuration information is different.

Step 502: Determine a transmission resource and/or a transmission mode based on the configuration information and assistance uplink transmission information, and perform uplink transmission.

In this embodiment of this disclosure, optionally, the assistance uplink transmission information may include one or more of the following: a capability of the terminal, uplink transmission related information, and information carried by a physical downlink control channel (PDCCH).

In this embodiment of this disclosure, optionally, the transmission resource and/or the transmission mode are/is determined based on the configuration information and one or more of the capability of the terminal, the uplink transmission related information, and the carried information. For exemplary description, reference may be made to Example 1 to Example 3 below.

In this embodiment of this disclosure, optionally, before step 502, the information carried by the PDCCH is received.

In this embodiment of this disclosure, optionally, after step 502, the method may further include: indicating the transmission resource and/or the transmission mode by using a PRACH resource, or indicating the transmission mode by using a PUSCH resource.

In this embodiment of this disclosure, optionally, a resource configured by the configuration information may include but is not limited to one or more of the following (1) to (6):
 (1) a time-frequency resource for occupation by data;
 (2) a time-frequency resource for occupation by a DMRS sequence;
 (3) a resource for which a DMRS sequence is generated using a zeroth type and data is modulated using a first type modulation;
 (4) a resource for which a DMRS sequence is generated not using a zeroth type and data is modulated not using a first type modulation;
 (5) a resource for which a DMRS sequence is generated not using a zeroth type and data is modulated using a first type modulation; and
 (6) a resource for which a DMRS sequence is generated using a zeroth type and data is modulated not using a first type modulation.

In this embodiment of this disclosure, optionally, the transmission mode may include but is not limited to one or more of the following (1) to (9):

(1) MCS;
(2) data being modulated using a first type modulation;
(3) data being modulated not using a first type modulation;
(4) a DMRS sequence being generated using a zeroth type;
(5) a DMRS sequence being generated not using a zeroth type;
(6) a transmission coding rate;
(7) a type of DMRS;
(8) density of DMRSs; and
(9) number of DMRSs.

In this embodiment of this disclosure, optionally, the capability of the terminal may include but is not limited to any one of the following (1) to (5):
(1) a capability of modualting data using a first type;
(2) a capability of generating a DMRS sequence using a zeroth type;
(3) a capability of modulating data using a first type and generating a DMRS sequence using a zeroth type;
(4) a capability of supporting a DMRS type; and
(5) a capability of a maximum output power of the terminal.

In this embodiment of this disclosure, optionally, the uplink transmission related information includes but is not limited to one or more of the following (1) to (8):
(1) path loss;
(2) transmit power of the terminal;
(3) transport block size;
(4) priority of uplink transmission content;
(5) type of uplink transmission content, for example, including but not limited to a control type and an application layer data type;
(6) number of retransmissions, where, for example, the number of retransmissions may include a number of 2-step random access retransmissions, a number of 4-step random access retransmissions, a number of failed 2-step random access retransmissions, a number of failed 4-step random access retransmissions, or the like;
(7) whether the number of transmissions has reached a preconfigured threshold; and
(8) transmission history information.

This embodiment of this disclosure can reduce scenarios of limiting a transmit power of the terminal, and improve transmission efficiency and coverage performance.

In Example 1 to Example 3 described below, the first type is Pi/2 BPSK. Certainly, it can be understood that an implementation for another modulation type is similar thereto.

Example 1

An implementation of Example 1 includes step 1 and step 2.

Step 1: UE receives, through broadcast, a plurality pieces of 2-step random access resource configuration information that are transmitted by a network side.

For example, the configuration information may include information about a PRACH resource, information about a PUSCH resource, information about a mapping relationship between a PRACH resource and a PUSCH resource, or the like.

In received information about a plurality of PUSCH resources, information corresponding to each PUSCH resource in each piece of configuration information may indicate whether the UE uses Pi/2 BPSK transmission.

(1) The Pi/2 BPSK transmission includes any one of the following: data being modulated using Pi/2 BPSK; a DMRS sequence being generated using Pi/2 BPSK; data being modulated using Pi/2 BPSK; and a DMRS sequence being generated using Pi/2 BPSK.

(2) The configuration information may further include whether data is modulated using Pi/2 BPSK and/or whether a DMRS sequence is generated using Pi/2 BPSK.

Different PUSCH resources may correspond to a same PRACH resource.

Step 2: Select a type of resource for uplink transmission, based on one or more of the following: whether the UE has a Pi/2 BPSK transmission capability, path loss, transmit power, transport block size of carried content, priority of carried content, type of carried content, and the like.

That the UE has the Pi/2 BPSK transmission capability may include one or more of the following: the UE has a capability of modulating data using Pi/2 BPSK; and a capability of generating a DMRS sequence using Pi/2 BPSK.

It can be understood that selecting which type of resource for uplink transmission based on whether the UE has the Pi/2 BPSK transmission capability includes:
based on whether the UE has the capability of modulting data using Pi/2 BPSK and/or the capability of generating a DMRS sequence using Pi/2 BPSK, determining which one of the plurality of resources configured in step 1 is to be used:
(1) a resource for which data is modulated using Pi/2 BPSK;
(2) a resource for which a DMRS sequence is generated using Pi/2 BPSK;
(3) a resource for which both data and a DMRS sequence use Pi/2 BPSK; and
(4) a resource for which neither data nor DMRS uses Pi/2 BPSK.

Example 2

An implementation of Example 2 includes step 1 and step 2.

Step 1: UE receives, through broadcast, one or more pieces of 2-step random access resource configuration information that are transmitted by a network side.

For example, the received configuration information may include that a plurality of types of modulation schemes are allowed to be configured on a same PUSCH resource.

For example, the configuration information includes but is not limited to allowing an indication that on the PUSCH resource, the UE may use the Pi/2 BPSK modulation scheme or may not use the Pi/2 BPSK modulation.

For example, the configuration information includes but is not limited to allowing an indication that on the PUSCH resource, the UE may use Pi/2 BPSK to generate a DMRS sequence, or may not use Pi/2 BPSK to generate a DMRS sequence.

Optionally, the configuration information further includes a mapping relationship between a PRACH resource and a PUSCH resource, for example, allowing a plurality of PRACH resources to be mapped to a same PUSCH resource.

In this example, different PRACH resources may be used to indicate a MCS to be used, whether Pi/2 BPSK is to be used, and other information.

Step 2: Select a corresponding PRACH resource and use a transmission mode corresponding to the PRACH resource for uplink transmission based on one or more of the following: whether the UE has a Pi/2 BPSK transmission capability, path loss, transmit power, transport block size of carried content, priority of carried content, type of carried content, and the like.

Example 3

An implementation of Example 3 includes step 1 and step 2.

Step 1: UE receives, through broadcast, one or more pieces of 2-step random access resource configuration information that are transmitted by a network side.

It can be understood that corresponding configuration may be as described in Example 1 or Example 2.

Step 2: A transmission mode similar to that in Example 1 or Example 2 may be used.

If a network triggers a 2-step RACH procedure:
(1) information carried by a PDCCH may be used to directly indicate configuration information to be used;
(2) the information carried by the PDCCH may include a corresponding MCS, a modulation type, and other information; or
(3) a mode similar to that in Example 1 or Example 2 may be used for transmission.

If UE triggers the 2-step RACH procedure, a mode similar to that in Example 1 or Example 2 may be used for transmission.

An embodiment of this disclosure further provides a terminal. Because a problem-resolving principle of the terminal is similar to that of the method for 2-step random access in the embodiments of this disclosure, for implementation of the terminal, reference may be made to the implementation of the method, and details are not described again.

Figure 6:
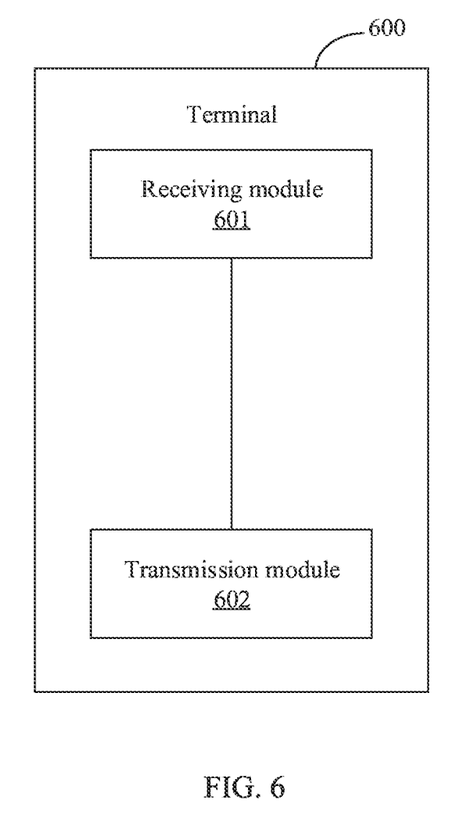
FIG. 6 is a first schematic structural diagram of a terminal according to an embodiment of this disclosure.

Referring to FIG. 6, an embodiment of this disclosure further provides a terminal. The terminal 600 includes:
a receiving module 601, configured to receive one or more pieces of configuration information for 2-step random access; and
a transmission module 602, configured to determine a transmission resource and/or a transmission mode based on the configuration information and assistance uplink transmission information, and perform uplink transmission.

In this embodiment of this disclosure, optionally, the transmission module 602 is further configured to: determine the transmission resource and/or the transmission mode based on the configuration information and one or more of a capability of the terminal, uplink transmission related information, and information carried by a physical downlink control channel PDCCH, and perform uplink transmission.

In this embodiment of this disclosure, optionally, the receiving module 601 is further configured to: receive information carried by the PDCCH.

In this embodiment of this disclosure, optionally, a resource configured by the configuration information includes but is not limited to one or more of the following (1) to (6):
(1) a time-frequency resource for occupation by data;
(2) a time-frequency resource for occupation by a DMRS sequence;
(3) a resource for which a DMRS sequence is generated using a zeroth type and data is modulated using a first type modulation;
(4) a resource for which a DMRS sequence is generated not using a zeroth type and data is modulated not using a first type modulation;
(5) a resource for which a DMRS sequence is generated not using a zeroth type and data is modulated using a first type modulation; and
(6) a resource for which a DMRS sequence is generated using a zeroth type and data is modulated not using a first type modulation.

For example, the a first type may be $\pi$(Pi)/2 binary phase shift keying (BPSK), or may be quadrature phase shift keying (QPSK), 16 quadrature amplitude modulation (16QAM), 64QAM, 256QAM, 1024QAM, 8 phase shift keying (8PSK), and other possible modulation types.

For example, DMRS sequence a zeroth type includes but is not limited to one or more of the following: a sequence generated by using a pseudo-random sequence and a QPSK modulation scheme, a sequence generated by using a pseudo-random sequence and a Pi/2 BPSK modulation scheme, a sequence generated based on a ZC sequence, a BPSK sequence obtained based on computer search, a QPSK sequence obtained based on computer search, an 8PSK sequence obtained based on computer search, or the like.

In this embodiment of this disclosure, optionally, the configuration information includes but is not limited to one or more of the following (1) to (5):
(1) information about one or more 2-step random access resources;
(2) first information indicating a mapping relationship between 2-step random access resources;
(3) second information indicating whether the terminal uses a specified transmission mode;
(4) third information indicating whether a specified transmission mode is to be used on a 2-step random access resource; or
(5) fourth information indicating time domain and/or frequency domain information for resource configuration.

In this embodiment of this disclosure, optionally, the second information is further used to indicate one or more of the following (1) to (9):
(1) a modulation and coding scheme (MCS);
(2) data being modulated using a first type modulation;
(3) data being modulated not using a first type modulation;
(4) a DMRS sequence being generated using a zeroth type;
(5) a DMRS sequence being generated not using a zeroth type;
(6) a transmission coding rate;
(7) a type of DMRS;
(8) density of DMRSs; and
(9) number of DMRSs.

In this embodiment of this disclosure, optionally, the first information further indicates a mapping relationship between a physical random access channel PRACH resource and a physical uplink shared channel PUSCH resource.

In this embodiment of this disclosure, optionally, the mapping relationship includes the following: different PUSCH resources correspond to a same PRACH resource, or different PRACH resources correspond to a same PUSCH resource.

In this embodiment of this disclosure, optionally, the transmission mode includes but is not limited to one or more of the following (1) to (9):
(1) MCS;
(2) data being modulated using a first type modulation;
(3) data being modulated not using a first type modulation;

(4) a DMRS sequence being generated using a zeroth type;
(5) a DMRS sequence being generated not using a zeroth type;
(6) a transmission coding rate;
(7) a type of DMRS;
(8) density of DMRSs; and
(9) number of DMRSs.

In this embodiment of this disclosure, optionally, the capability of the terminal includes any one of the following (1) to (5):
(1) a capability of modulating data using a first type;
(2) a capability of generating a DMRS sequence using a zeroth type;
(3) a capability of modulating data using a first type and generating a DMRS sequence using a zeroth type;
(4) a capability of supporting a DMRS type; or
(5) a capability of a maximum output power of the terminal.

In this embodiment of this disclosure, optionally, the uplink transmission related information includes one or more of the following (1) to (5):
(1) path loss;
(2) transmit power of the terminal;
(3) transport block size;
(4) priority of uplink transmission content;
(5) type of uplink transmission content, for example, including but not limited to a control type and an application layer data type;
(6) number of retransmissions, including a number of 2-step random access retransmissions, a number of 4-step random access retransmissions, a number of failed 2-step random access retransmissions, a number of failed 4-step random access retransmissions, or the like;
(7) whether the number of transmissions has reached a preconfigured threshold; and
(8) transmission history information.

In this embodiment of this disclosure, optionally, the terminal further includes: an indication module, configured to indicate the transmission resource and/or the transmission mode by using a PRACH resource, or indicate the transmission mode by using a PUSCH resource.

The terminal provided in this embodiment of this disclosure may perform the foregoing method embodiment, implementation principles and technical effects of the terminal are similar thereto, and details are not described again herein in this embodiment.

Figure 7:
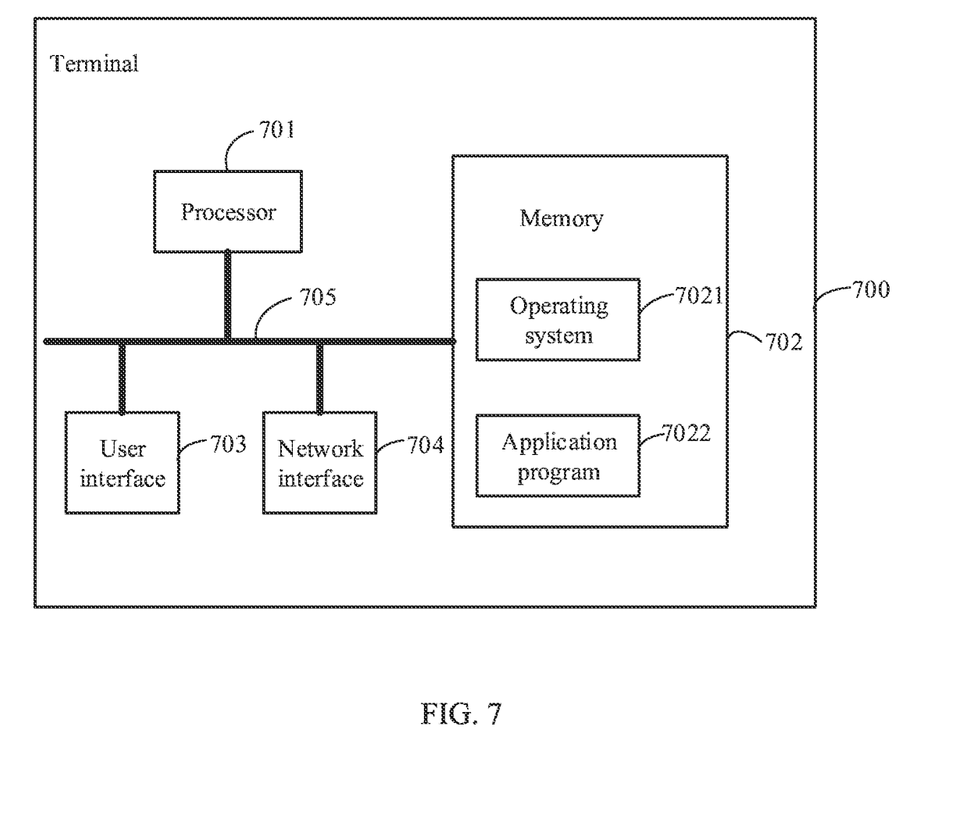
FIG. 7 is a second schematic structural diagram of a terminal according to an embodiment of this disclosure.

As shown in FIG. 7, a terminal 700 shown in FIG. 7 includes at least one processor 701, a memory 702, at least one network interface 704, and a user interface 703. Various components of the terminal 700 are coupled by using a bus system 705. It can be understood that the bus system 705 is used to implement connection and communication between these components. In addition to a data bus, the bus system 705 also includes a power bus, a control bus, and a status signal bus. However, for clarity of description, various buses are marked as the bus system 705 in FIG. 7.

The user interface 703 may include a display, a keyboard, or a clicking device, for example, a mouse, a trackball, a touch panel, or a touchscreen.

It can be understood that the memory 702 in this embodiment of this disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (Erasable PROM, EPROM), an electrically erasable programmable read-only memory (Electrically EPROM, EEPROM), or a flash memory. The volatile memory may be a random access memory (RAM), and is used as an external cache. By way of example instead of limitation, many forms of RAM are available, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 702 of the system and the method described in the embodiments of this disclosure is intended to include but is not limited to these and any other suitable type of memory.

In some implementations, the memory 702 stores the following elements: executable modules or data structures, or a subset thereof, or an extended set thereof: an operating system 7021 and an application program 7022.

The operating system 7021 includes various system programs, for example, a framework layer, a kernel library layer, and a driver layer, and is used to implement various basic services and process hardware-based tasks. The application program 7022 includes various application programs, for example, a media player and a browser, and is used to implement various application services. A program for implementing the method in the embodiments of this disclosure may be included in the application program 7022.

In an embodiment of this disclosure, when a program or instructions stored in the memory 702, which may be specifically a program or instructions stored in the application program 7022, are invoked, the following steps are implemented: receiving one or more pieces of configuration information for 2-step random access; and determining a transmission resource and/or a transmission mode based on the configuration information and assistance uplink transmission information, and performing uplink transmission.

The terminal provided in this embodiment of this disclosure may perform the foregoing method embodiment, implementation principles and technical effects of the terminal are similar thereto, and details are not described again herein in this embodiment.

The method or algorithm steps described in combination with content disclosed in this disclosure may be implemented by hardware, or may be implemented by a processor by executing software instructions. The software instruction may be formed by a corresponding software module. The software module may be stored in a RAM, a flash memory, a ROM, an EPROM, an EEPROM, a register, a hard disk, a removable hard disk, a read-only compact disc, or a storage medium of any other form known in the art. For example, a storage medium is coupled to the processor, so that the processor can read information from the storage medium or write information into the storage medium. Certainly, the storage medium may be a component of the processor. The processor and the storage medium may be carried in an ASIC. In addition, the ASIC may be carried in a core network interface device. Certainly, the processor and the storage medium may exist in the core network interface device as discrete components.

Persons skilled in the art should be aware that in the foregoing one or more examples, functions described in this disclosure may be implemented by hardware, software, firmware, or any combination thereof. When implemented by software, the foregoing functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of this disclosure are further described in detail in the foregoing specific implementations. It should be understood that the foregoing descriptions are merely specific implementations of this disclosure, and are not intended to limit the protection scope of this disclosure. Any modification, equivalent replacement, or improvement made on the basis of the technical solutions of this disclosure shall fall within the protection scope of this disclosure.

Persons skilled in the art should understand that the embodiments of this disclosure can be provided as a method, a system, or a computer program product. Therefore, the embodiments of this disclosure may be hardware-only embodiments, software-only embodiments, or embodiments with a combination of software and hardware. Moreover, the embodiments of this disclosure may use a form of a computer program product that is implemented on one or more computer-usable storage media (including but not limited to a magnetic disk memory, a CD-ROM, an optical memory, and the like) that include computer-usable program code.

The embodiments of this disclosure are described with reference to the flowcharts and/or block diagrams of the method, the device (system), and the computer program product according to the embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions can also be stored in a computer readable memory that can guide a computer or another programmable data processing device to work in a specific manner, so that the instructions stored in the computer readable memory generate a product including an instruction apparatus. The instruction apparatus implements functions specified in one or more procedures of a flowchart and/or one or more blocks of a block diagram.

These computer program instructions can also be loaded into a computer or another programmable data processing device, so that a series of operation steps are executed on the computer or the another programmable device to generate processing implemented by the computer, and the instruction executed on the computer or the another programmable device provide steps of functions specified in one or more procedures of a flowchart and/or one or more blocks of a block diagram.

Obviously, persons skilled in the art can make various modifications and variations to the embodiments of this disclosure without departing from the spirit and scope of this disclosure. In this way, this disclosure is intended to include these modifications and variations of the embodiments of this disclosure provided that they fall within the scope of the claims of this disclosure and their equivalent technologies.

What is claimed is:

1. A method for 2-step random access, applied to a terminal, comprising:
   receiving configuration information for 2-step random access; and
   determining a transmission resource and/or a transmission mode based on the configuration information and assistance uplink transmission information, and performing uplink transmission according to the transmission resource and/or the transmission mode, wherein the uplink transmission comprises msgA;
   wherein the assistance uplink transmission information comprises at least one of a capability of the terminal, or uplink transmission related information;
   wherein the uplink transmission related information comprises one or more of the following:
   path loss;
   priority of uplink transmission content;
   type of uplink transmission content;
   number of retransmissions;
   whether the number of transmissions has reached a pre-configured threshold; and
   transmission history information.

2. The method according to claim 1, wherein the configuration information comprises one or more of the following:
   information about one or more 2-step random access resources;
   first information indicating a mapping relationship about 2-step random access resources;
   second information indicating a transmission mode to be used;
   third information indicating whether a specified transmission mode is to be used on a 2-step random access resource; or
   fourth information indicating time domain and/or frequency domain information for resource configuration.

3. The method according to claim 1, wherein a resource configured by the configuration information comprises one or more of the following:
   a time-frequency resource for occupation by data;
   a time-frequency resource for occupation by a demodulation reference signal (DMRS) sequence;
   a resource for which a DMRS sequence is generated using a zeroth type and data is modulated using a first type modulation;
   a resource for which a DMRS sequence is generated not using a zeroth type and data is modulated not using a first type modulation;
   a resource for which a DMRS sequence is generated not using a zeroth type and data is modulated using a first type modulation; or
   a resource for which a DMRS sequence is generated using a zeroth type and data is modulated not using a first type modulation.

4. The method according to claim 2, wherein the first information further indicates a mapping relationship between physical random access channel (PRACH) resources and physical uplink shared channel (PUSCH) resources.

5. The method according to claim 4, wherein the mapping relationship comprises:

that different PUSCH resources correspond to a same PRACH resource, or that different PRACH resources correspond to a same PUSCH resource.

6. The method according to claim 1, further comprising:
indicating the transmission resource and/or the transmission mode by using a PRACH resource; or
indicating the transmission mode by using a PUSCH resource.

7. The method according to claim 1, wherein the transmission mode comprises one or more of the following:
modulation and coding scheme (MCS);
data being modulated using a first type modulation;
data being modulated not using a first type modulation;
a DMRS sequence being generated using a zeroth type;
a DMRS sequence being generated not using a zeroth type;
a transmission coding rate;
a type of DMRS;
density of DMRSs; and
number of DMRSs.

8. The method according to claim 1, wherein the capability of the terminal comprises one or more of the following:
a capability of modulating data using a first type;
a capability of generating a DMRS sequence using a zeroth type;
a capability of modulating data using a first type and generating a DMRS sequence using a zeroth type;
a capability of supporting a DMRS type; and
a capability of a maximum output power of the terminal.

9. A terminal, comprising a processor, a memory, and a program stored on the memory and capable of running on the processor, wherein when the program is executed by the processor, a method for 2-step random access is implemented, and the method comprises:
receiving configuration information for 2-step random access; and
determining a transmission resource and/or a transmission mode based on the configuration information and assistance uplink transmission information, and performing uplink transmission according to the transmission resource and/or the transmission mode, wherein the uplink transmission comprises msgA;
wherein the assistance uplink transmission information comprises at least one of a capability of the terminal, or uplink transmission related information;
wherein the uplink transmission related information comprises one or more of the following:
path loss;
priority of uplink transmission content;
type of uplink transmission content;
number of retransmissions;
whether the number of transmissions has reached a pre-configured threshold; and
transmission history information.

10. The terminal according to claim 9, wherein the configuration information comprises one or more of the following:
information about one or more 2-step random access resources;
first information indicating a mapping relationship about 2-step random access resources;
second information indicating a transmission mode to be used;
third information indicating whether a specified transmission mode is to be used on a 2-step random access resource; or
fourth information indicating time domain and/or frequency domain information for resource configuration.

11. The terminal according to claim 9, wherein a resource configured by the configuration information comprises one or more of the following:
a time-frequency resource for occupation by data;
a time-frequency resource for occupation by a demodulation reference signal (DMRS) sequence;
a resource for which a DMRS sequence is generated using a zeroth type and data is modulated using a first type modulation;
a resource for which a DMRS sequence is generated not using a zeroth type and data is modulated not using a first type modulation;
a resource for which a DMRS sequence is generated not using a zeroth type and data is modulated using a first type modulation; or
a resource for which a DMRS sequence is generated using a zeroth type and data is modulated not using a first type modulation.

12. The terminal according to claim 10, wherein the first information further indicates a mapping relationship between physical random access channel (PRACH) resources and physical uplink shared channel (PUSCH) resources.

13. The terminal according to claim 12, wherein the mapping relationship comprises:
that different PUSCH resources correspond to a same PRACH resource, or that different PRACH resources correspond to a same PUSCH resource.

14. The terminal according to claim 9, further comprising:
indicating the transmission resource and/or the transmission mode by using a PRACH resource; or
indicating the transmission mode by using a PUSCH resource.

15. The terminal according to claim 9, wherein the transmission mode comprises one or more of the following:
modulation and coding scheme (MCS);
data being modulated using a first type modulation;
data being modulated not using a first type modulation;
a DMRS sequence being generated using a zeroth type;
a DMRS sequence being generated not using a zeroth type;
a transmission coding rate;
a type of DMRS;
density of DMRSs; and
number of DMRSs.

16. The terminal according to claim 9, wherein the capability of the terminal comprises one or more of the following:
a capability of modulating data using a first type;
a capability of generating a DMRS sequence using a zeroth type;
a capability of modulating data using a first type and generating a DMRS sequence using a zeroth type;
a capability of supporting a DMRS type; and
a capability of a maximum output power of the terminal.

17. A non-transitory computer-readable storage medium, wherein the non-transitory computer-readable storage medium stores a computer program, and when the computer program is executed by a processor, a method for 2-step random access is implemented, and the method comprises:
receiving configuration information for 2-step random access; and
determining a transmission resource and/or a transmission mode based on the configuration information and assistance uplink transmission information, and performing uplink transmission according to the transmission resource and/or the transmission mode, wherein the uplink transmission comprises msgA;
wherein the assistance uplink transmission information comprises at least one of a capability of the terminal, or uplink transmission related information;
wherein the uplink transmission related information comprises one or more of the following:
path loss;
priority of uplink transmission content;
type of uplink transmission content;
number of retransmissions;
whether the number of transmissions has reached a pre-configured threshold; and
transmission history information.

* * * * *